US 6,691,484 B2

(12) United States Patent
Ezumi et al.

(10) Patent No.: US 6,691,484 B2
(45) Date of Patent: *Feb. 17, 2004

(54) HOLLOW EXTRUDED FRAME MEMBER FOR FRICTION STIR WELDING AND STRUCTURE BODY FORMED THEREFROM

(75) Inventors: Masakuni Ezumi, Kudamatsu (JP); Akihiro Satou, Hitachi (JP); Kazusige Fukuyori, Kudamatsu (JP); Takeshi Kawasaki, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/286,887

(22) Filed: Nov. 4, 2002

(65) Prior Publication Data

US 2003/0056459 A1 Mar. 27, 2003

Related U.S. Application Data

(62) Division of application No. 09/875,173, filed on Jun. 7, 2001, now Pat. No. 6,494,011, and a division of application No. 09/875,174, filed on Jun. 7, 2001, now abandoned, which is a division of application No. 09/332,009, filed on Jun. 14, 1999, now Pat. No. 6,250,037.

(30) Foreign Application Priority Data

Jun. 16, 1998 (JP) .......................................... 10-168016

(51) Int. Cl.[7] .............................. E04B 5/10; B23K 20/12
(52) U.S. Cl. ........................ 52/592.1; 52/650.3; 52/580; 52/314; 52/732.1; 228/112.1
(58) Field of Search .............................. 52/592.1, 592.4, 52/650.3, 731.2, 732.1, 731.6, 580, 588.1, 690, 314; 296/230.01, 204, 205; 228/112.1; 14/13–14

(56) References Cited

U.S. PATENT DOCUMENTS

| 3,755,978 | A | * | 9/1973 | Jackson ..................... 52/127.7 |
| 4,966,082 | A | * | 10/1990 | Takeichi et al. ............ 296/204 |
| 5,410,855 | A | | 5/1995 | Claussen et al. |
| 5,617,677 | A | | 4/1997 | Hallsten |
| 5,651,154 | A | * | 7/1997 | Ahlskog et al. ........... 52/588.1 |
| 5,836,128 | A | | 11/1998 | Groh et al. |
| 5,911,662 | A | | 6/1999 | Hallsten |
| 6,035,588 | A | * | 3/2000 | Zehner et al. .................. 52/98 |
| 6,050,474 | A | * | 4/2000 | Aota et al. ................ 228/112.1 |
| 6,131,355 | A | * | 10/2000 | Groh et al. ................. 52/592.1 |
| 6,250,037 | B1 | | 6/2001 | Ezumi et al. |

* cited by examiner

Primary Examiner—Winnie S. Yip
(74) Attorney, Agent, or Firm—Antonelli, Terry, Stout & Kraus, LLP

(57) ABSTRACT

End portions of face plates 111 and 112 of a frame member 110 are connected by a rib 116A. To protrusion chips 117b1 and 117b2 end portions of face plates 101 and 102 of another frame member 100 are overlapped. The corners between the rib 116A and the rear faces of the face plates 111 and 112 are in the form of a convex circular arc 131 which protrudes into a hollow portion 119 of the frame member 110. Both end portions of the circular arc 131b1 are connected to the rib 116A and the face plates 111 and 112 by two smooth recessed circular arcs 132b1 and 133b1. Accordingly, since a flow-out of metal does not occur from this portion, the cross-section can be small and a light weight structure an be obtained. A structural body formed of hollow frame members which are joined by friction stir welding provides a light weight structure.

10 Claims, 2 Drawing Sheets

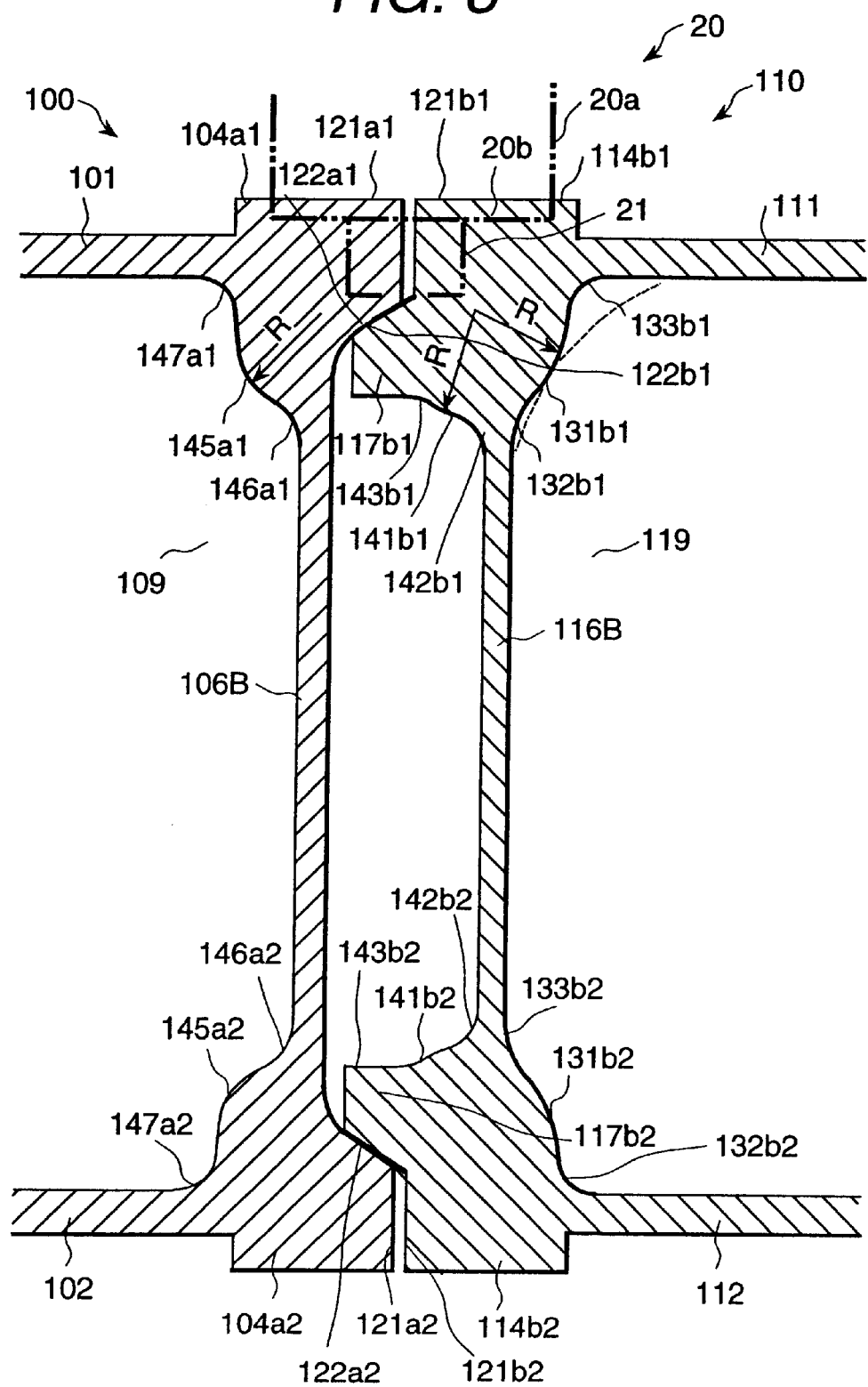

HOLLOW EXTRUDED FRAME MEMBER FOR FRICTION STIR WELDING AND STRUCTURE BODY FORMED THEREFROM

CROSS-REFERENCE OF RELATED APPLICATIONS

This application is a Divisional application of application Ser. No. 09/875,173, filed Jun. 7, 2001, now U.S. Pat. No. 6,494,011, and is a Divisional application of application Ser. No. 09/875,174, filed Jun. 7, 2001, now abandoned each of which is a Divisional application of application Ser. No. 09/332,009, filed Jun. 14, 1999 now U.S. Pat. No. 6,250,037.

BACKGROUND OF THE INVENTION

The present invention relates to a structural body and to a hollow extruded frame member used to form the structural body by friction stir welding. The invention relates more particularly to a novel joint shape of a structural body formed by joining hollow extruded frame members using friction stir welding.

The present invention relates to a structural body and hollow extruded frame members used in forming the structural body by friction stir welding, and the invention relates particularly to structural members suited to use, for example, as an aluminum alloy member of the type used in a railway vehicle and in building construction.

As described in Japanese application patent laid open publication No. Hei. 9-309164 (EP 0797043 A2), a friction stir welding method is a method in which, by rotating a round rod (referred to hereinafter as a rotary body) which is inserted into a joint between hollow extruded frame members to be joined and by moving the rotary body along a line of the joint between the frame members to be joined, the joint of the frame members is exothermally heated and softened and the joint is elastically fluidized to form a solid weld.

The rotary body for carrying out the friction stir welding comprises a small diameter portion which is inserted in the joint and a large diameter portion which is positioned outside the joint. The small diameter portion and the large diameter portion of the rotary body have the same axis. A boundary face portion between the small diameter portion and the large diameter portion of the rotary body is inserted a little into the joint. The welding according to the friction stir welding method may be applied to an abutting portion of two frame members or to an overlapping portion of the frame members.

As disclosed in the above-state publication, a protruding portion of a frame member is provided at the portion of the frame member to be subjected to welding. This protruding portion of the frame member comes into contact with the rotary body, so that the protruding portion of the frame member is welded using the friction stir welding method. As further disclosed in the publication, a protrusion chip is provided at the portion of the frame member to be subjected to welding. This protrusion chip protrudes from a rib of an end portion of one of the hollow extruded frame members to be subjected to welding toward the other hollow extruded frame member to which it is to be joined. On this protrusion chip a face plate of the other hollow extruded frame member is overlapped.

Since friction stir welding is carried out by inserting a rotary body serving as a joining tool into a joint between the hollow frame members to be welded causing metal to be fluidized, a large force is exerted on the frame members during welding. Namely, a large force is required for inserting the rotary body into the joint between the frame members to be welded, and so the frame members must be constructed to endure this large force. As a result, when the hollow extruded frame members are joined, as described in the above-stated publication, metal easily flows to a rear side of the joint. Therefore, it is necessary to make the protruding portion of the hollow extruded frame members rather large for supplementing the amount of metal which flows in the joint. Further, void holes occur easily in a joining bead of the frame members.

As one means for preventing the above-stated various defects, the thickness of the frame member to be subjected to welding is made large at the joint portion, thereby the flow-out of metal from the frame members can be prevented. For example, by giving a large circular arc shape to the corner between the face plate and the rib at the joining portion of the frame member, the thickness of an outer portion of the frame member to be subjected to welding can be increased. Further, for example, by making the diameter of the circular arc shape of the corner between the protrusion chip and the rib of the frame member large, the thickness of the outer portion of the frame member to be subjected to welding can be increased.

The above stated circular arc shape of the frame member to be subjected to welding is recessed toward a side of the face plate of the frame member. Accordingly, the cross sectional area of the frame member to be subjected to welding becomes large, with the result that the weight of the frame member increases.

SUMMARY OF THE INVENTION

An object of the present invention is to provide a structural body wherein a light weight joint member or light weight joining portion of the structural body can be attained and to provide a hollow extruded frame member wherein a light weight joint member or a light weight joining portion of the hollow extruded frame member can be attained.

Another object of the present invention is to provide a structural body having a small cross-sectional area and a hollow extruded frame member having a small cross-sectional area which can be easily and effectively welded using friction stir welding.

The above stated object can be attained by shaping the corner between a rib at a vicinity of a joining portion and a face plate of a hollow extruded frame member or a corner between a protrusion chip and a rib of the hollow extruded frame member in the form of a circular arc which protrudes outwardly from the corner at the center thereof, namely a circular arc which protrudes toward an inner hollow portion of the hollow extruded frame member.

According to the present invention, a structural body is characterized in that it is formed of a first member having two substantially parallel first face plates and plural first ribs for connecting the two first face plates, and a second member having two substantially parallel second face plates and plural second ribs for connecting the two second face plates, wherein the first member and the second member are joined by two joining beads, one of the two joining beads joins one of the two first face plates of the first member to one of the two second face plates of the second member, the other of the two joining beads joins the other of the two first face plates of the first member and the other of the two second face plates of the second member. In accordance with the present invention, a corner between the first rib of the first member in the vicinity of one of the two joining beads and a rear face of the one of the two first face plates of the first member at a position of a first hollow portion of the first member is in the form of a first circular protruding arc which extends into the first hollow portion of the first member.

According to the present invention, a structural body is characterized in that it is formed of a first member having two substantially parallel first face plates and plural first ribs for connecting the two first face plates, and a second member having two substantially parallel second face plates and plural second ribs for connecting the two second face plates, wherein the first member and the second member are joined by two joining beads, one of the two joining beads joins one of the two face plates of the first member to one of the two second face plates of the second member, the other of the two joining beads joins the other of the two first face plates of the first member and the other of the two second face plates of the second member. In accordance with the present invention, the two joining beads are positioned respectively at an intermediate portion between a first rib of the first member and a second rib of the second member in the vicinity of the joint, and one of the two second face plates of the second member overlaps a protrusion chip which protrudes from the first rib in the vicinity of the one of the two joining beads toward the second member. Further, the corner between the first rib in the vicinity of the one of the two joining beads and a rear face of one of the first face plates at a position of a hollow portion of the two first members is in the form of a circular protruding arc which extends into the hollow portion of the first member, and a corner between the second rib in the vicinity of the one of the two joining beads and a rear face of one of the two second face plates at a position of a hollow portion of the second member is in the form of a circular protruding arc which extends into the hollow portion of the second member.

BRIEF DESCRIPTION OF THE DRAWINGS

FIG. 3 is a partially enlarged longitudinal cross-sectional view showing a structural body having a joint subjected to friction stir welding according to another embodiment of the present invention.

DETAILED DESCRIPTION OF THE INVENTION

Figure 1:
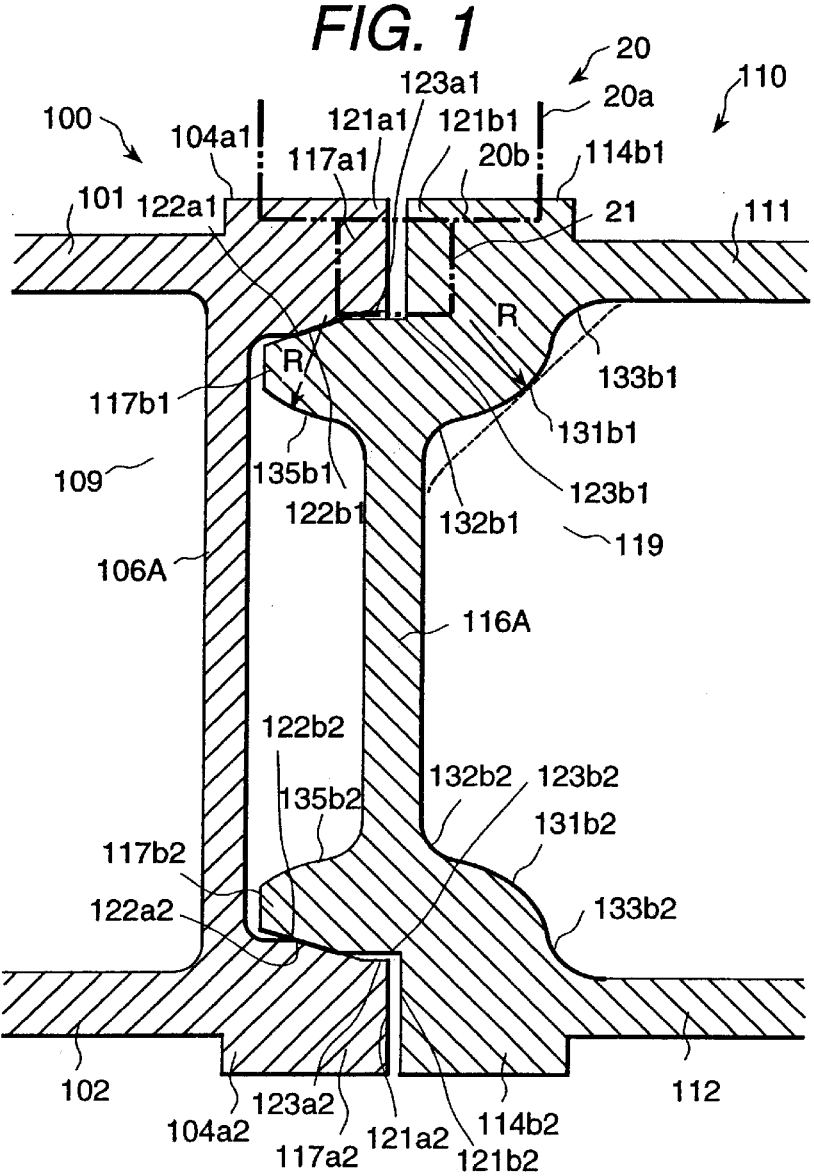
FIG. 1 is a partially enlarged longitudinal cross-sectional view showing a structural body having a joint subjected to friction stir welding according to one embodiment of the present invention.

A structural body according to one embodiment of the present invention will be explained with reference to FIG. 1 and FIG. 2. A member to be subjected to welding by using, for example, friction stir welding is made of a metal material, for example, an aluminum alloy hollow extruded frame member. By joining frame members, a structural body, for example, a car body of a railway vehicle, can be manufactured. With the joining of plural frame members, a side body structure, a roof body structure, an end body structure, and a floor body structure of the car body of a railway vehicle, can be constructed.

In the case of the side body structure and the roof body structure of the car body of a railway vehicle, the length of the frame member for constituting the side body structure or the roof body structure is equal to the length of the car body of the railway vehicle at the most. The longitudinal direction of the frame member for constituting the side body structure or the roof body structure is directed in the longitudinal direction of the car body of the railway vehicle.

A first hollow extruded frame member 100 for constituting the structural body comprises two substantially parallel face plates 101 and 102, plural ribs 103 and 106A for connecting the face plates 101 and 102, and two outwardly protruding portions 104a1 and 104a2, which protrude in the thickness direction of the frame member 100 and form part of the protrusion chips 117a1 and 117a2, which extend in the longitudinal direction thereof.

A second hollow extruded frame member 110 for constituting the structural body comprises two substantially parallel face plates 111 and 112, plural ribs 113 and 116A for connecting the face plates 111 and 112, two outwardly protruding portions 114b1 and 114b2 which protrude in the thickness direction of the frame member 110, and two protruding chips 117b1 and 117b2, which protrude in a longitudinal direction from the rib 116A a an end portion of the frame member 110.

The plural ribs 103 of the frame member 100 are provided along the width direction of the frame member 100. Each rib 103 of the frame member 100 is provided to incline relative to the face plates 101 and 102. The rib 106A of the frame member 100 is an end rib and is provided orthogonal to the face plates 101 and 102. The reference numeral 109 denotes a hollow portion of the frame member 100. The plural ribs 113 of the frame member 110 are provided along the width direction of the frame member 10. Each rib 113 of the frame member 110 is provided to incline relative to the face plates 111 and 112. The rib 116A of the frame member 110 is an end rib and is provided orthogonal to the face plates 111 and 112. The reference numeral 119 denotes a hollow portion of the frame member 110.

The end portion of the frame member 100 has two vertical faces 121a1 and 121a2, two sloping faces 122a1 and 122a2, a horizontal face 123a1 for connecting the vertical face 121a1 and the sloping face 122a1, and a horizontal face 123a2 for connecting the vertical face 121a2 and the sloping face 122a2. The vertical face 121a1 is provided at the end of the face plate 101 of the frame member 100, and the vertical face 121a2 is provided at the end of the face plate 102 of the frame member 100. The horizontal face 123a1 is provided in parallel with the face plate 101 of the frame member 100, and the horizontal face 123a2 is provided in parallel with the face plate 102 of the frame member 110.

The sloping face 122a1 of the frame member 100 is provided on the inwardly facing side of the protrusion chip 117a1, and the sloping face 122a2 of the frame member 100 is provided on the inwardly facing side of the protrusion chip 117a2. The sloping face 122a1 of the frame member 100 is provided to form one side of an opening which receives the protrusion chip 117b1 of the frame member 110. The sloping face 122a2 of the frame member 100 is provided to form the other side of the opening which receives the protrusion chip 117b2 of the frame member 110. The sloping face 122a1 is angled outwardly in the thickness direction of the frame member 100 and joins an inward end of the horizontal face 123a1. The sloping face 122a2 is angled outwardly in the thickness direction of the frame member 100 and joins an inward end of the horizontal face 123a2.

The protruding portion 104a1 protrudes outwardly from the side of the frame member 100 in the width direction of the frame member 100. The protruding portion 104a2 protrudes outwardly from the side of the frame member 100 in the width direction of the frame member 100. The protrusion chip 117a1 is provided at the end portion of the face plate 101 of the frame member 100, and the protrusion chip 117a2 is provided at the end portion of the face plate 102 of the frame member 100.

The end portion of the frame member 110 has two vertical faces 121b1 and 121b2, two sloping faces 122b1 and 122b2, a horizontal face 123b1 for connecting the vertical face 121b1 and the sloping face 122b1, and a horizontal face 123b2 for connecting the vertical face 121b2 and the sloping face 122b2. The vertical face 121b1 is provided at the end of the face plate 111 of the frame member 100, and the vertical face 121b2 is provided at the end of the face plate 112 of the frame member 110. The horizontal face 123b1 is provided in parallel with the face plate 111 of the frame member 110, and the horizontal face 123b2 is provided in parallel with the face plate 112 of the frame member 110.

The sloping face 122b1 of the frame member 110 is provided on the outwardly facing side of the protrusion chip 117b1, and the sloping face 122b2 of the frame member 110 is provided on the outwardly facing side of the protrusion chip 117b2.

The sloping face 122b1 of the frame member 110 is provided to form an engaging portion which mates with sloping face 122a1 of the protrusion chip 117a1 of the frame member 100, and the sloping face 122b2 of the frame member 110 is provided to form an engaging portion which mates with the sloping face 122a2 of the protrusion chip 117a2 of the frame member 100. The sloping face 122b1 is angled inwardly in the thickness direction of the frame member 110 from an outward end of the horizontal face 123b1, and the sloping face 122b2 is angled inwardly in the thickness direction of the frame member 110 from an outward end of the horizontal face 123b2.

The protruding portion 114b1 protrudes outwardly from the side of the frame member 110 in the width direction of the frame member 110. The protruding portion 114b2 protrudes outwardly from the side of the frame member 110 in the width direction of the frame member 110. The protrusion chip 117b1 is provided at the end portion of the face plate 111 of the frame member 110. The protrusion chip 117b2 is provided at the end portion of the face plate 112 of the frame member 110.

The rib 116A of the frame member 110 is positioned on an extension line of a welding joint of the two frame members 100 and 110. More particularly, the face plates 111 and 112 of the frame member 110 are supported by the rib 116A, which is positioned such that the axis of a rotary body 20 to be used for the welding is positioned on an extension line of a center of the plate thickness of the rib 116A of the frame member 110. Both the vertical face 121b1 and the vertical face 121b2 of the frame member 110 are positioned a little on one side of the center toward the frame member 110 from the center extension line of the plate thickness of the rib 116A. Both the vertical face 121b1 of the frame member 100 and the vertical face 121b2 of the frame member 110 are provided within a range on the other side of the center extension line of the rib 116A. The plate thickness of the rib 116A of the frame member 110 is greater than the plate thickness of the rib 106A of the frame member 100.

When the two frame members 100 and 110 are abutted, the vertical face 121a1 of the frame member 100 and the vertical face 121b1 of the frame member 110 come into abutting contact with one another. Further, when the two frame members 100 and 110 are abutted, the vertical face 121a2 of the frame member 100 and the vertical face 121b2 of the frame member 110 come into abutting contact with one another. However, this is an ideal case, and so, depending on the dimension tolerance difference in the structural body, in many cases, a gap is formed between the vertical face 121a1 of the frame member 100 and the vertical face 121b1 of the frame member 110, and a gap also is formed between the vertical face 121a2 of the frame member 100 and the vertical face 121b2 of the frame member 110.

Figure 2:
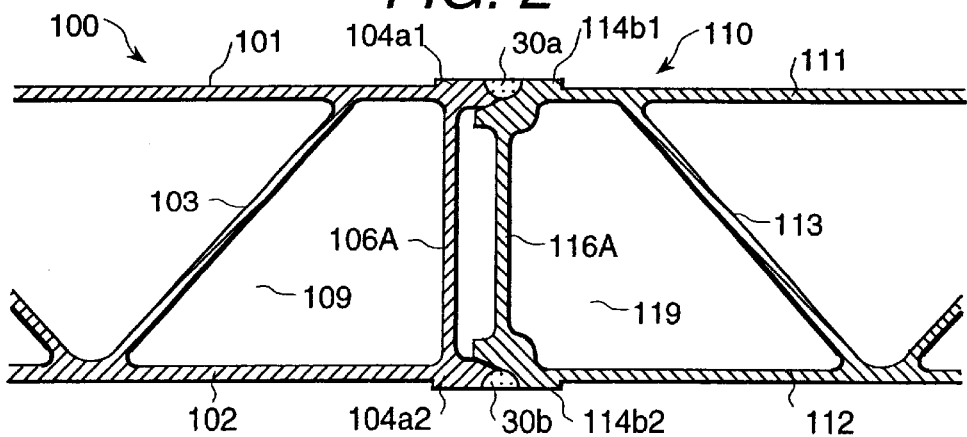
FIG. 2 is a partially enlarged longitudinal cross-sectional view of a structural body which is comprised of two hollow extruded frame members and using the joint configuration of the structural body shown in FIG. 1.

In FIG. 1 and FIG. 2, the sloping face 122a1 of the frame member 100 and the sloping face 122b1 of the frame member 110 are shown as being in contact with each other, and the sloping face 122a2 of the frame member 100 and the sloping face 122b2 of the frame member 110 are shown as being in contact with each other, but in many cases there may be a gap between these faces.

When the two frame members 100 and 110 are assembled, the surfaces of the outer faces of the two face plates 101 and 102 of the frame member 100 and the outer faces of the two face plates 111 and 112 of the frame member 110 are joined. Namely, the sloping faces 122a1 and 122a2 of the frame member 100 are recessed, but the sloping faces 122b1 and 122b2 of the frame member 110 are raised. Accordingly, the two frame members 100 and 110 can be assembled easily.

In the middle of the corner between a rear face of the face plate 111, which is positioned at the hollow portion 119 of the frame member 110, and the rib 116A of the frame member 110 there is provided a circular arc portion 131b1 which protrudes into the hollow portion 119 of the frame member 110, and a recessed circular arc portion 132b1 and a recessed circular arc portion 133b1 are provided on respective sides of the circular arc portion 131b1. Further, in the middle of the corner between a rear face of the face plate 112, which is positioned at the hollow portion 119 of the frame member 110, and the rib 116A of the frame member 110 there is provided a circular arc portion 131b2, which protrudes into the hollow portion 119, and a recessed circular arc portion 132b2 and a recessed circular arc portion 133b2 are provided on respective sides of the circular arc portion 131b2. The recessed circular arc portions 132b1 and 133b1 of the frame member 110 are produced in the formation of the protruding circular arc portion 131b1 of the frame member 110. The recessed circular arc portions 132b2 and 133b2 of the frame member 110 are produced in the formation of the protruding circular arc portion 131b2 of the frame member 110.

The recessed circular arc portions 132b1 and 133b2 of the frame member 110 are recessed from a tangent line which passes through a central peak of the circular arc portion 131b1 of the frame member 110. The protruding circular arc portion 131b1 of the frame member 110 can be referred to as a circular arc shaped protruding portion in accordance with the present invention. Also, the recessed circular arc portions 132b2 and 133b2 of the frame member 110 are recessed from a tangent line which passes through a central peak of the circular arc portion 131b2 of the frame member 110. The protruding circular arc portion 131b2 of the frame member 110 can be referred to as a circular arc shaped protruding portion in accordance with the present invention.

The position of the circular arc portion 131b1 of the frame member 110 is determined to ensure that a predetermined distance R is provided to a tip end of a small diameter portion 21 of the rotary body 20 when the rotary body 20 is inserted to a predetermined position, as shown in FIG. 1. A center peak position of the circular arc portion 131b1 of the frame member 110 is determined such that a position of a corner of the small diameter portion 21 of the rotary body 20, which has been inserted to the above predetermined position, forms a standard basis.

Since the insertion force of the rotary body 20 is supported by the rib 116A of the frame member 110, in the prior art the metal can flow out easily to an outer portion from a surrounding portion of this rib 116A. Accordingly, the thickness of the above-stated portion surrounding this rib 116A of the frame member 110 is made larger.

According to experimentation performed by the inventors of the present invention, the distance from the corner of the small diameter portion 21 of the rotary body 20 to the peak of the circular arc portion 131$b$1 of the frame member 110 is 5 mm, for example. In the prior art, the metal flows out easily through the gap formed between the sloping face 122$a$1 of the frame member 100 and the sloping face 122$b$1 of the frame member 110, and the metal also flows out easily through the gap formed between the protrusion chip 117$b$1 of the frame member 110 and the rib 106A of the frame member 100. Herein, the dotted line in FIG. 1 represents the shape of the corner between the rib and the face plate according to the conventional technique of the prior art. In this example of the prior art, the surface follows a linear line at a central portion and has small circular arcs provided at both ends of the linear line. The linear line at the central portion is a tangent line which contacts a central portion of the circular arc 131$b$1 or the circular arc 131$b$2 of the frame member 110. As another example of the prior art, the entire connecting surface is formed to have a concave circular arc shape which is recessed toward a joining bead of the frame members 100 and 110.

As will be understood from a comparison of the dotted line, which depicts the connecting surface according to the prior art, with the contour of the connecting surface according to the present invention, a cross-sectional area of the parts, which comprise the portion between the frame member 100 and the rib 106A and the portion between the frame member 110 and the rib 116A, can be made small by the employment of the present invention. As a result, according to this embodiment of the present invention, a frame member having a light weight structure for constituting the structural body can be attained.

In this embodiment according to the present invention, the recessed portions are formed at both ends of the circular arc portion 131$b$1 of the frame member 110 and also at both ends of the circular arc portion 131$b$2 of the frame member 110. However, it is possible to provide such a recessed portion only at one end of the circular arc portion 131$b$1 of the frame member 110 or at only one end of the circular arc portion 131$b$2 of the frame member 110. In such a case, at a side where the recessed portion is not provided, a linear line is connected to an end portion of the circular arc, and this end portion and a rib (or a face plate) are connected by another circular arc. In this case, the weight of the structure of the frame member for constituting the structure body also can be lowered.

A rear face at the tip end of the protrusion chip 117$b$1 of the frame member 110 is formed as a circular arc which grows thinner toward the tip end of the protrusion chip 117$b$1 of the frame member 110. Also, a rear face at the tip end of the protrusion chip 117$b$2 of the frame member 110 is formed as a circular arc which grows thinner toward the tip end of the protrusion chip 117$b$2 of the frame member 110. The inner side of the protrusion chip 117$b$1 is formed as a circular arc 135$b$1 and the inner side of the protrusion chip 117$b$2 is formed as a circular arc 135$b$2. The circular arc 135$b$1 has the same radius as the circular arc 131$b$1 and the circular arc 135$b$2 has the same radius as the circular arc 131$b$2.

The rotary body 20 for carrying out friction stir welding has a small diameter portion 21 at a tip end of a large diameter round rod portion 20$a$. A boundary face 20$b$, formed between the large diameter portion 20$a$ and the small diameter portion 21 of the rotary body 20, has a circular shape which is recessed to a side of the large diameter portion 20$a$. The small diameter portion 21 of the rotary body 20 is a screw member.

The friction stir welding for joining the two frame members 100 and 110 is carried out by rotating the rotary body 20 and inserting the rotary body 20 into the joint between the two frame members 100 and 110 and moving it along the line of the joint between the two frame members 100 and 110. The axis of the rotary body 20 is tilted such that the side of the large diameter portion 20$a$ of the rotary body 20 is inclined against the moving direction of the rotary body 20 along the joint line. Accordingly, a rear end of the boundary face portion 20$b$ of the rotary body 20 is inserted into the two frame members 100 and 110, however a front end of the boundary face portion 20$b$ of the rotary body 20 is positioned outside of the outer face (in FIG. 1, in the case of the upper side protruding portion 104$a$1 of the frame member 100 and the upper side protruding portion 114$b$1 of the frame member 110) of an upper portion of an apex of the protruding portion 104$a$1 of the frame member 100 and an upper portion of an apex of the protruding portion 114$b$1 of the frame member 110.

The rear end of the boundary face portion 20$b$ of the rotary body 20 is positioned between the protruding portion 104$a$1 of the frame member 100 and the protruding portion 114$b$1 of the frame member 110 and the outer faces of the two face plates 101 and 102 of the frame member 100 and the two face plates 111 and 112 of the frame member 110. The term "rear end" and the term "front end" in this description of the present invention are defined in relation to the moving direction of the rotary body 20 as a standard basis.

FIG. 1 shows a condition where the rotary body 20 is inserted to a predetermined depth into the two frame members 100 and 110 for forming the structural body. In FIG. 1, a part of the tip end of the small diameter portion 21 of the rotary body 20 is omitted. The tip end of the small diameter portion 21 of the rotary body 20 is positioned in the vicinity of the horizontal face 123$a$1 of the frame member 100 and the horizontal face 123$b$1 of the two frame member 110.

During the friction stir welding process, the two frame members 100 and 110 are pressed together and are secured to a bed (not shown in the figure) by means of a vise (not shown in the figure). To bring the sloping face 122$a$1 of the frame member 100 and the sloping face 122$b$1 of the frame member 110 into firm contact with each other, the frame member 100 is pressed against the opposed frame member 110.

During the friction stir welding process, there is a roller (not shown in figure) which moves in accompaniment with the linear movement of the friction stir welding rotary body 20. The roller presses down on the right and the left sides of the protruding portion 104$a$1 of the frame member 100 and on the right and left sides of the protruding portion 114$b$1 of the frame member 110, on the upper portion of the protruding portion 104$a$1 of the frame member 100 and on the upper portion of the protruding 114$b$1 of the frame member 110.

Each of the friction stir welding operations for joining the upper and lower portions of the frame member 100 and the frame member 110 is carried out as follows. Namely, after one side of the two frame members 100 and 110 has been joined by friction stir welding, the two frame members 100 and 110 are turned over to perform friction stir welding on the other side, or by providing two rotary bodies 20, a simultaneous friction stir welding can be carried out on both sides.

The number of the frame members 110 which are mounted on the bed is two or more than two. After the friction stir welding process, the structural body obtained by this friction stir welding process is carried out again to join a further frame member, until a structural member of sufficient length for the car body of the railway vehicle is obtained.

Since abutted faces of the frame members 100 and 110 are provided with the sloping faces 122a1 and 122a2 on the frame member 100 and the sloping faces 122b1 and 122b2 on the frame member 110, the two frame members 100 and 110 can be assembled in such a way that slip-off in the up and down directions between the two frame members 100 and 110 can be prevented.

Further, when the sloping face 122a1 of the frame member 100 and the sloping face 122b1 of the frame member 110 and the sloping face 122a2 of the frame member 100 and the sloping face 122b2 of the frame member 110 are in contact with each other, in comparison with a non-contact condition, the flow-out of the metal from these portions as described in the above-stated case can be prevented.

The gap formed between the vertical face 121a1 of the frame member 100 and the vertical face 121b1 of the frame member 110 is closed, and a gap formed between the vertical face 121a2 of the frame member 100 and the vertical face 121b2 of the frame member 110 is closed, by the flow of metal from the protruding portions 104a1 and 104a2 of the frame member 100 and the protruding portions 114b1 and 114b2 of the frame member 110.

The vertical faces 121a1 and 121a2 of the frame member 100 and the vertical faces 121b1 and 121b2 of the frame member 110 may have a slight incline, however, it is necessary to move a large amount of metal from the protruding portions 104a1 and 104a2 of the frame member 100 and the protruding portions 114b1 and 114b2 of the frame member 110.

At the end portions of the protrusion chips 117b1 and 117b2 of the frame member 110, the two sloping faces 122a1 and 122a2 of the frame member 100 and the two sloping faces 122b1 and 122b2 of the frame member 110 are provided. However, it is possible to provide faces which are parallel with the face plates 101 and 102 of the frame member 100 and the face plates 111 and 112 of the frame member 110.

After the friction stir welding process, as may be required, the protruding face 104a1 of the frame member 100 and the protruding face 114b1 of the frame member 110 may be cut off to provide a smooth face on the outer surface of the face plate 101 of the frame member 100 and the face plate 111 of the frame member 110. Also, the protruding face 104a2 of the frame member 100 and the protruding face 114b2 of the frame member 110 may be cut off to provide a smooth face on the outer surface of the face plate 102 of the frame member 100 and the face plate 112 of the frame member 110.

In a case where the structural member is employed as a car body of a railway vehicle, as shown in FIG. 2, the protruding face 104a1 of the frame member 100 and the protruding face 104b1 of the frame member 110 are cut off or otherwise removed from the outer surface of the car body of the railway vehicle. Also the protruding face 104a2 of the frame member 100 and the protruding face 104b2 of the frame member 110 are cut off or otherwise removed from the outer surface of the car body of the railway vehicle. Reference numeral 30a and 30b shown in FIG. 2 denote a joining bead of the two frame members 100 and 110, respectively.

A structural body and a hollow extruded frame member according to another embodiment of the present invention will be explained with reference to FIG. 3. FIG. 3 is a partially enlarged longitudinal cross-sectional view showing a structural body having a joint member for application of friction stir welding according to the present invention.

In the structural body shown in FIG. 3, a welding joint is positioned on a line which passes midway between a rib 106B of the frame member 100 and a rib 116B of the frame member 110. The corner between the rib 116B and the face plate 111 of the frame member 110 is formed as one circular arc shaped protrusion 131b1, and the corner between the rib 116B and the face plate 112 of the frame member 110 is formed as another circular arc shaped protrusion chip 131b2.

A root of the rib 116B and the protrusion chip 117b1 of the frame member 110 are connected by a convex circular arc shaped portion 141b1, which is raised to extend away from the face plate 111 of the frame member 110, and two concave circular arc shaped portions 142b1 and 143b1, which are recessed toward the face plate 111 of the frame member 110. A root of the rib 116B and the protrusion chip 117b2 of the frame member 110 are connected by a convex circular arc shaped portion 141b2, which is raised to extend away from the face plate 112 of the frame member 110, and two concave circular arc shaped portions 142b2 and 143b2, which are recessed toward the face plate 112 of the frame member 110.

The corner between the rib 106B and the face plate 101 of the frame member 100 is formed as a convex circular arc portion 145a1, which is raised toward the hollow portion 109, and two concave circular arc portions 146a1 and 147a1, which are recessed toward the vertical face 121a1 of the face plate 101 of the frame member 100. Further, the corner between the rib 106B and the face plate 102 of the frame member 100 is formed as a convex circular arc portion 145a2, which is raised toward the hollow portion 109, and the two concave circular arc portions 146a2 and 147a2, which are recessed toward the vertical face 121a2 of the face plate 102 of the frame member 100.

The dotted line shown in FIG. 3 represents the shape of the corner surface according to the conventional technique provided in the prior art, wherein the entire connecting surface according to the conventional technique forms a circular arc. The connection line in the form of a continuous circular arc according to the conventional technique, which is in contrast to the circular arcs 141b1, 142b1 and 143b1 of the protrusion chip 117b1, has been omitted. Also, the connection line in the form of a continuous circular arc according to the conventional technique, in contrast to the circular arcs 141b2, 142b2 and 143b2 of the protrusion chip 117b2, has been omitted. Further, the two connection lines in the form of continuous circular arcs according to the conventional technique in the prior art at the side of the face plates 101 and 102 of the frame member 100 have been omitted.

The dimensions of the circular arcs 131b1, 141b1 of the face plate 111 of the frame member 110 and of the circular arc 145a1 of the face plate 101 of the frame member 100 are the same. Namely, the radius of each of the circular arcs 131b1, 141b1 of the frame member 110 and of the circular arc 145a1 of the frame member 100 has an equal size. Further, the dimensions of each of the circular arcs 131b2 and 141b2 of the face plate 112 of the frame member 110 and of the circular arc 145a2 of the face plate 102 of the frame member 100 are the same. Namely, the radius of each of the circular arcs 131b2 and 141b2 of the frame member 110 and of the circular arc 145a2 of the frame member 100 has an equal size.

With the structural body and the hollow extruded frame member of this embodiment according to the present invention, since the load during the friction stir welding process is primarily supported by the two ribs 106B and 116B, the frame members in the vicinity of the two ribs 106B and 116B are formed to be thicker. The portions in the vicinity of the two ribs 106B and 116B are the connection parts of the face plates 101 and 102 of the frame member 100 and of the face plates 111 and 112 of the frame member 110.

Further, with the structural body and the hollow extruded frame member according to this embodiment of the present invention, the total value of the plate thicknesses of the two ribs 106B and 116B can be made smaller than that of the structural body of the former embodiment according to the present invention as shown in FIG. 1 and FIG. 2. As a result, with the structural body and the hollow extruded frame member of this embodiment according to the present invention, a light weight structural body and a light weight hollow extruded frame member can be obtained.

While the plate thickness of the rib 116B of the frame member 110 is made thicker than the plate thickness of the rib 116A of the frame member 100 shown in FIG. 1 and FIG. 2, the plate thickness of the rib 106B of the frame member 110 and the plate thickness of the rib 116B of the frame member 110 can be the same thickness in this embodiment.

Further, each of the portions between the rib 106B and the face plates 111 and 112 of the frame member 110, between the rib 106B and the protrusion chip 117b1 of the frame member 110 and the protrusion chip 117b2 of the frame member 110, and, further, each of the portions between the rib 106B and the face plates 101 and 102 of the frame member 100, are configured such that a light weight structural body and a light weight hollow extruded frame member can be obtained.

Since the recessed portions 132b1 and 133b1 formed between the concave circular arc portion 131b1 and the rib 116B of the face plate 111 of the frame member 110 are small, and the recessed portions 132b2 and 133b2 formed between the concave circular arc portion 131b2 and the rib 116B of the face plate 112 of the frame member 110 are small, it is possible to employ a design in which no recessed portion is provided in the frame member 110. For example, a tangent line is provided between a peak end portion of the circular arc 131b1 and the rib 116B, and this tangent line and the rib 116B are connected by a circular arc. When the protrusion chip 117b1 or 117b2 of the frame member 110 is provided at a side of the rib 106B, a similar effect can be obtained.

Further, if the sloping face 122a1 of the face plate 101 of the frame member 100 and the sloping face 122a2 of the face plate 102 of the frame member 100 are omitted, a horizontal face can be employed. In this case, the sloping face 122b1 of the protrusion chip 117b1 of the frame member 110 and the sloping face 122b2 of the protrusion chip 117b2 of the frame member 110 are omitted, and a horizontal face is employed.

When the two frame members 100 and 110 are assembled, the sloping face 122a1 of the face plate 101 of the frame member 100 and the sloping face 122b1 of the face plate 111 of the frame member 110 are in contact with each other and a gap is provided between the vertical face 121a1 of the face plate 101 of the frame member 100 and the vertical face 121b1 of the face plate 111 of the frame member 110. Further, when the two frame members 100 and 110 are assembled, the sloping face 122a2 of the face plate 102 of the frame member 100 and the sloping face 122b2 of the face plate 112 of the frame member 110 are in contact with each other and a gap is provided between the vertical face 121a2 of the face plate 101 of the frame member 100 and the vertical face 121b2 of the face plate 112 of the frame member 110. For example, the interval between the recessed portion of the sloping faces 122a1 and 122a2 of the frame member 100 is smaller than the interval between the raised portion of the sloping faces 122b1 and 122b2 of the frame member 110. As a result, with the structural body and the hollow extruded frame member of this embodiment according to the present invention, the flow-out of the metal from the sloping face 122a1 of the frame member 100 and the sloping face 122b1 of the frame member 110 can be prevented, and further the flow-out of the metal from the sloping face 122a2 of the frame member 100 and the sloping face 122b2 of the frame member 110 can be prevented.

The technical range accorded to the present invention is not limited to the terms used to describe the various embodiments herein or the terms used in defining the means for solving the problems inherent in the prior art, but includes a range equivalents which would be apparent to the man of the ordinary technical field to which the invention is directed.

Although, the present invention has been described and illustrated in detail, it is to be clearly understood that the description is presented by way of illustration and example, and it is not to be taken by way of limitation. The spirit and scope of the present invention are limited only by the terms of the appended claims.

According to the present invention, in the case where friction stir welding is employed, a structural body and the hollow extruded frame member can be made as a light weight structure.

What is claimed is:

1. A hollow extruded frame member capable of being welded by friction stir welding, having two substantially parallel face plates and plural ribs connecting said two substantially parallel face plates, wherein:

a connection portion is provided between a rib, of said plural ribs, at one end portion of said hollow extruded frame member and one of said two substantially parallel face plates, said connection portion being a portion in which the friction stir welding is carried out;

in said connection portion between said rib and said one of said two substantially parallel face plates, a connection line, between said rib and said one of said two substantially parallel face plates, facing the other of said two substantially parallel face plates, is in a form of a circular arc which protrudes into a side of a hollow portion formed between said two substantially parallel face plates and said rib;

at said one of said two substantially parallel face plates, a protrusion chip protruding from said rib at said one end portion is provided, said protrusion chip extending beyond said one of said two substantially parallel face plates;

said one end portion of said one of said two substantially parallel face plates of said hollow extruded frame member is adapted to be welded to a member at said connection portion by the friction stir welding; and said protrusion chip of said rib is located such that one end of said member is adapted to receive said protrusion clip of said rib.

2. A hollow extruded frame member according to claim 1, wherein both end portions of said circular arc are dented in a direction toward said one of said two substantially parallel face plates.

3. A structure body comprising:

said hollow extruded frame member according to claim 1 and said member, wherein said one end of said member is mounted on said protrusion chip of said rib and welded thereto by the friction stir welding.

4. A structure body according to claim 3, wherein:

said member, forming said structure body with said hollow extruded frame member, includes another hollow extruded frame member having two substantially parallel face plates and plural another ribs connecting said two substantially parallel face plates, said hollow extruded frame member being one hollow extruded frame member, such that said structure body includes said one hollow extruded frame member and said another hollow extruded frame member;

another connection portion is provided between another rib at one end portion of said another hollow extruded frame member and one of said two substantially parallel face plates of said another hollow extruded frame member, said another connection portion being another portion in which the friction stir welding is carried out;

another connection line, between said another rib and said one of said two substantially parallel face plates of said another hollow extruded frame member, facing the other of said two substantially parallel face plates of said another hollow extruded frame member, is in a form of another circular arc which protrudes into a side of another hollow portion formed between said two substantially parallel face plates of said another hollow extruded frame member and said another rib;

at said one of said two substantially parallel face plates of said another hollow extruded frame member, another protrusion chip protruding from said another rib at said one end portion is provided, said another protrusion chip extending beyond said one of said two substantially parallel face plates of said another hollow extruded frame member; and said one end portion of said another hollow extruded frame member communicates with said one end portion of said one hollow extruded frame member.

5. A structure body according to claim 4, wherein said another hollow extruded frame member is said member.

6. A structure body according to claim 4, wherein both end portions of said another circular arc formed on said another hollow extruded frame member are dented in a direction toward said one of said two substantially parallel face plates of said another hollow extruded frame member.

7. A structure body comprising:

said hollow extruded frame member according to claim 1, which constitutes one hollow extruded frame member of said structure body; and said member, which is another hollow extruded frame member which is welded, by friction stir welding, to said one hollow extruded frame member.

8. A structure body according to claim 7, wherein said another hollow extruded frame member includes two substantially parallel face plates and plural another ribs connecting said two substantially parallel face plates;

another connection portion is provided between another rib at one end portion of said another hollow extruded frame member and one of said two substantially parallel face plates of said another hollow extruded frame member, said another connection portion being another portion in which the friction stir welding is carried out;

another connection line, between said another rib and said one of said two substantially parallel face plates of said another hollow extruded frame member, facing the other of said two substantially parallel face plates of said another hollow extruded frame member, is in a form of another circular arc which protrudes into a side of another hollow portion formed between said two substantially parallel face plates of said another hollow extruded frame member and said another rib;

at said one of said two substantially parallel face plates of said another hollow extruded frame member, another protrusion chip protruding from said another rib at said one end portion is provided, said another protrusion chip extending beyond said one of said two substantially parallel face plates of said another hollow extruded frame member; and said one end portion of said another hollow extruded frame member communicates with said one end portion of said one hollow extruded frame member.

9. A structure body according to claim 7, wherein said one hollow extruded frame member and said another hollow extruded frame member are directly welded to each other by friction stir welding.

10. A structure body according to claim 8, wherein both end portions of said another circular arc formed on said another hollow extruded frame member are dented in a direction toward said one of said two substantially parallel face plates of said another hollow extruded frame member.

* * * * *